(12) United States Patent
Vogt

(10) Patent No.: US 10,272,732 B2
(45) Date of Patent: Apr. 30, 2019

(54) SENSOR LINKED SUSPENSION

(71) Applicant: GM GLOBAL TECHNOLOGY OPERATIONS LLC, Detroit, MI (US)

(72) Inventor: Kyle Vogt, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 15/609,460

(22) Filed: May 31, 2017

(65) Prior Publication Data

US 2018/0345748 A1    Dec. 6, 2018

(51) Int. Cl.
| | |
|---|---|
| *B60G 17/015* | (2006.01) |
| *B60G 17/016* | (2006.01) |
| *B60G 17/019* | (2006.01) |
| *G05D 1/08* | (2006.01) |

(52) U.S. Cl.
CPC ....... *B60G 17/0152* (2013.01); *B60G 17/016* (2013.01); *B60G 17/01933* (2013.01); *B60G 17/01941* (2013.01); *G05D 1/0891* (2013.01); *B60G 2400/206* (2013.01); *B60G 2401/10* (2013.01); *B60G 2600/21* (2013.01); *B60G 2800/702* (2013.01); *B60G 2800/7022* (2013.01)

(58) Field of Classification Search
CPC .............. B60G 17/0152; B60G 17/016; B60G 17/01933; B60G 17/01941; B60G 2800/702; B60G 2800/7022
USPC ................................ 280/6.153, 6.154, 6.155
See application file for complete search history.

(56) References Cited

U.S. PATENT DOCUMENTS

| | | | | |
|---|---|---|---|---|
| 5,438,515 | A * | 8/1995 | Miichi | B60G 3/26 280/5.521 |
| 7,744,099 | B2 * | 6/2010 | Holbrook | B60G 17/016 280/6.153 |
| 9,597,940 | B2 * | 3/2017 | Anderson | B60G 17/016 |

* cited by examiner

*Primary Examiner* — Faye M Fleming
(74) *Attorney, Agent, or Firm* — Lorenz & Kopf, LLP

(57) ABSTRACT

Systems and method are provided for adjusting a sensor of a vehicle having a suspension. In one example, a method for adjusting a sensor of a vehicle having a suspension system includes obtaining sensor data pertaining to a sensor of the vehicle; determining, via a processor, when the sensor is out of alignment, using the sensor data; and adjusting the suspension system, resulting in an adjustment of the alignment of the sensor, when the sensor is determined to be out of alignment.

20 Claims, 6 Drawing Sheets

SENSOR LINKED SUSPENSION

TECHNICAL FIELD

The present disclosure generally relates to vehicles, and more particularly relates to systems and methods pertaining to automatically adjusting an alignment of sensors of a vehicle using a vehicle suspension system.

BACKGROUND

A number of vehicles have one or more autonomous features. For example, an autonomous vehicle is a vehicle that is capable of sensing its environment and navigating with little or no user input. It does so by using sensors such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

In certain circumstances it may be desirable for improved operation of vehicles. For example, in certain circumstances, an alignment of one of the sensors may be altered from an original alignment, thus causing the sensed data to be altered. In these circumstances, it may be desirable to re-align the sensor. Accordingly, it is desirable to provide systems and methods for automatic adjusting of an alignment of a sensor of the vehicle. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for adjusting a sensor of a vehicle having a suspension. In one example, a method for adjusting a sensor of a vehicle having a suspension system includes obtaining sensor data pertaining to a sensor of the vehicle; determining, via a processor, when the sensor is out of alignment, using the sensor data; and adjusting the suspension system, resulting in an adjustment of the alignment of the sensor, when the sensor is determined to be out of alignment.

In another example, a system for adjusting a sensor of a vehicle having a suspension system includes a detection module, a processing module, and an actuating module. The detection module is configured to obtain sensor data pertaining to a sensor of the vehicle. The processing module is configured to determine when the sensor is out of alignment, using the sensor data. The actuating module is configured to adjust the suspension system, resulting in an adjustment of the alignment of the sensor, when the sensor is determined to be out of alignment.

In another example, a system for adjusting a sensor of a vehicle having a suspension system includes a processor and an actuator. The processor is configured to determine when the sensor is out of alignment, using sensor data pertaining to the sensor. The actuator is configured to adjust the suspension system, resulting in an adjustment of the alignment of the sensor, when the sensor is determined to be out of alignment.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
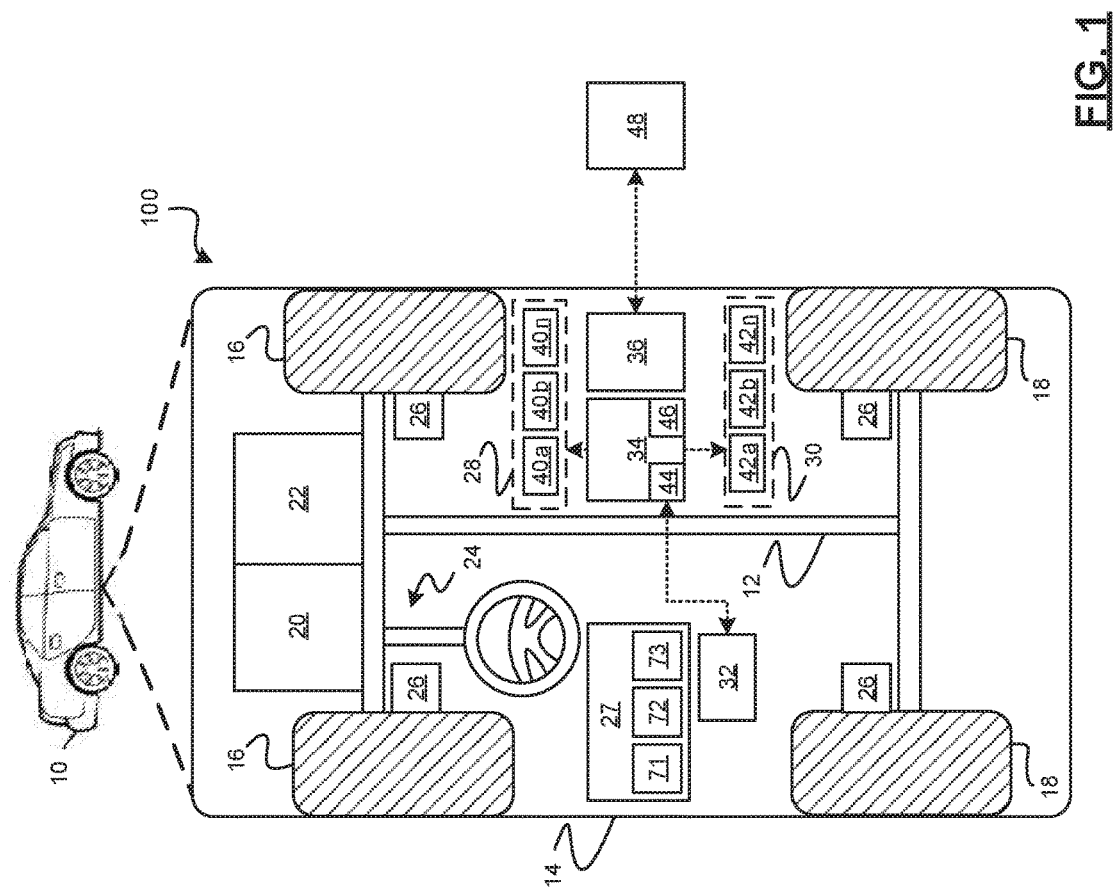
FIG. 1 is a functional block diagram illustrating a vehicle having a sensor alignment adjustment system, in accordance with various embodiments.

With reference to FIG. 1, a sensor alignment adjustment system shown generally as 100 is associated with a vehicle 10 in accordance with various embodiments. In general, the sensor alignment adjustment system (or simply "system") 100 provides for automatic adjustment of an alignment of sensors of a sensor system 28 via adjustment of a suspension system 27 via actuators of an actuator system 30. These adjustments are provided in certain appropriate circumstances in which the sensors have fallen out of an original alignment. For example, when the sensors are originally aligned, the vehicle 10 may be assumed to be a plane that is horizontal with a level ground plane and a sensor may be originally aligned with a horizontal surface of the vehicle 10. During use of the vehicle 10, the sensor may become misaligned when the horizontal surface of the vehicle 10 becomes no longer substantially horizontal or the ground plane to which the vehicle is resting becomes no longer substantially horizontal.

For example, when a number of passengers enter the vehicle 10, an uneven weight distribution within the vehicle 10 may cause the horizontal surface of the vehicle 10 to no longer be substantially horizontal (e.g., the vehicle 10 is pitched or rolled with respect to the ground plane). In another example, when the vehicle 10 is operating on uneven terrain (e.g., the vehicle is traveling along a pitched or rolled terrain), the sensor may be substantially parallel to the ground plane, but may not be substantially horizontal. As can be appreciated, various conditions may alter the alignment of the sensor as the disclosure is not limited to the present examples.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 comprise a wheel assembly that also includes respective associated tires.

In various embodiments, the vehicle 10 is an autonomous vehicle, and the sensor alignment adjustment system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous, non-autonomous, or other vehicle that includes sensors and a suspension system.

As shown, the vehicle 10 generally includes a propulsion system 20, a transmission system 22, a steering system 24, a brake system 26, a suspension system 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel for illustrative purposes, in some embodiments contemplated within the scope of the present disclosure, the steering system 24 may not include a steering wheel.

The suspension system 27 connects the vehicle 10 and the wheels 16, 18. In various embodiments, the suspension system 27 provides support for different qualities of operation of the vehicle 10 that include road holding (e.g., steering stability), road handling (e.g., cornering), and road isolation (e.g., ride comfort). Also in various embodiments, the suspension system 27 includes one or more shock absorbers 71, springs 72 (e.g., in one embodiment, one or more airbags serving as springs 72), one or more adjustment systems 73 (e.g., a hydraulic system, electromagnetic system, and/or electromechanical system), and/or one or more other components (e.g., linkages, tires associated with the wheels 16, 18, actuators, and the like, among other possible components) that affect relative motion between the vehicle 10 and the wheels 16, 18.

In various embodiments, the suspension system 27 is an adjustable suspension system, in which one or more components thereof may be adjusted via respective actuators. In various embodiments, the suspension system 27 is adjustable in order to adjust road isolation, road handling, ride height above one or more wheels in contact with the ground, and/or road isolation for the vehicle 10. Also in various embodiments, the suspension system 27 is further adjustable in order to adjust an alignment of sensors of the sensor system 28 in certain appropriate circumstances.

The sensor system 28 includes one or more sensors 40a-40n that sense observable conditions of the exterior environment and/or the interior environment of the vehicle 10. The sensors 40a-40n include, but are not limited to, radars, lidars, global positioning systems, optical cameras, thermal cameras, ultrasonic sensors, inertial measurement units, and/or other sensors. In certain embodiments, the sensors 40a-40n are brought back into alignment as necessary via adjustments that are provided via the suspension system 27.

The actuator system 30 includes one or more actuators 42a-42n that control one or more vehicle features such as, but not limited to, the propulsion system 20, the transmission system 22, the steering system 24, the brake system 26, and the suspension system 27. In various embodiments, vehicle 10 may also include interior and/or exterior vehicle features not illustrated in FIG. 1, such as various doors, a trunk, and cabin features such as air, music, lighting, touchscreen display components (such as those used in connection with navigation systems), and the like.

In certain embodiments, one or more of the actuators 42a-42n include linear actuators and/or other actuators for shock absorbers, wheel and/or tire actuators, airbag and/or spring actuators, airbags for suspension control systems (e.g., a hydraulic system, an electromagnetic system, and/or electromechanical system), and/or other actuators for adjusting the suspension system 27.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location.

Also in various embodiments, the data storage device 32 stores predetermined threshold values used for determining when one or more of the sensors 40a-40n of the sensor system 28 are out of alignment, such that the alignment would be adjusted via the suspension system 27, for example as discussed in greater detail further below. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, as discussed in detail below, controller 34 is configured for use in determining whether a sensor is out of alignment, and controlling one or more components of the suspension system 27 to adjust the alignment of the sensor such that it becomes realigned. In other embodiments, one or more other controllers and/or processors (e.g., one or more controllers and/or processors of the suspension system 27, the sensor system 28, and/or the actuator system 30) may perform some or all of these functions.

Figure 2:
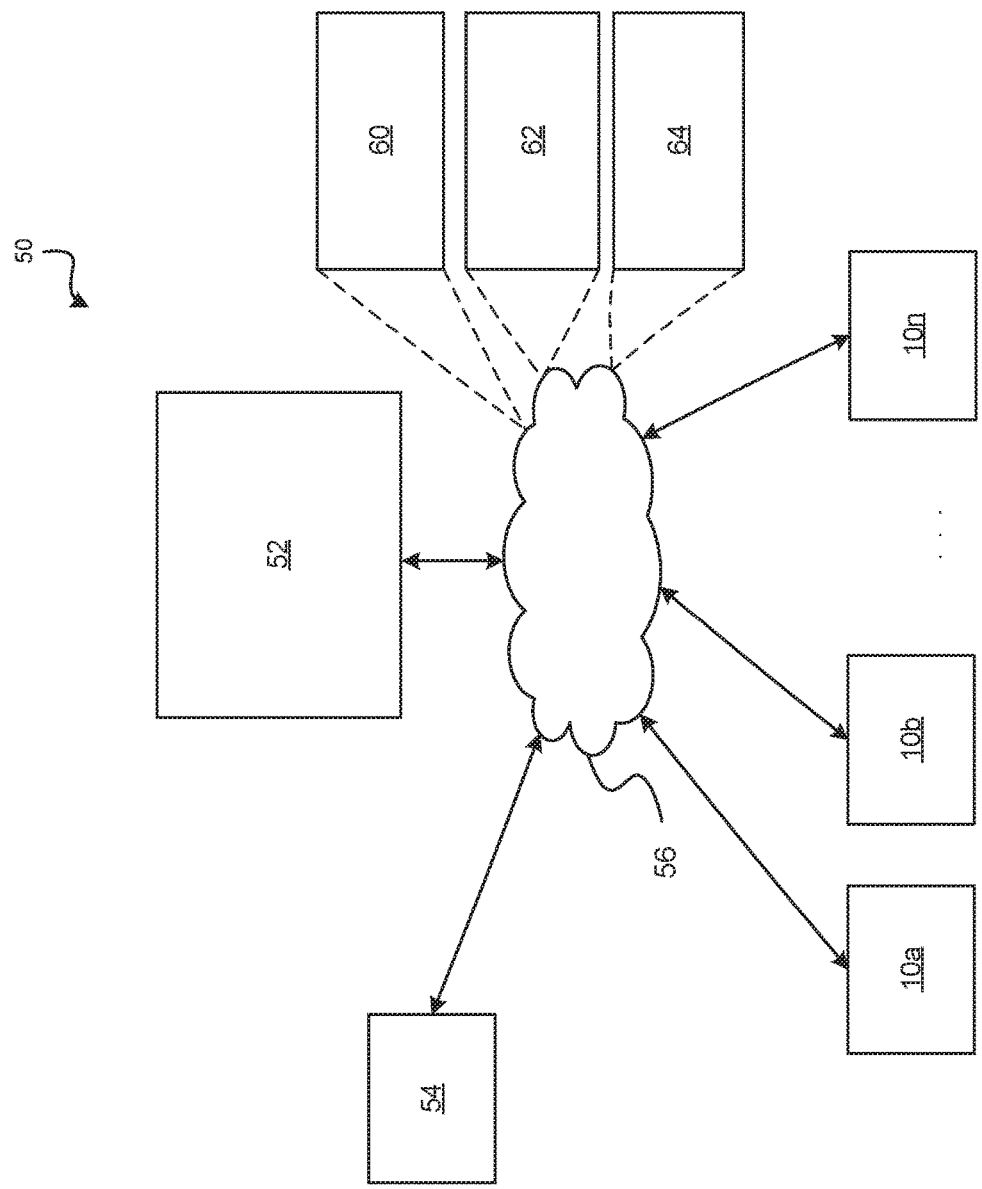
FIG. 2 is a functional block diagram illustrating a transportation system having one or more vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In certain embodiments, the communication system 36 is further configured for communication between the sensor system 28, the actuator system 30, one or more controllers (e.g., the controller 34), and/or the suspension system 27. For example, the communication system 36 may include any combination of a controller area network (CAN) bus and/or direct wiring between the sensor system 28, the actuator system 30, and/or one or more controllers 34. In certain embodiments, the communication system 36 is used to communicate information pertaining to the sensors 40a-40n as being out of alignment to one or more controllers (e.g., the controller 34 and/or one or more other controllers and/or processors of the suspension system 27, the sensor system 28, and/or the actuator system 30). Also in certain embodiments, the communication system 36 is used to communicate instructions from the controller(s) 34 to the actuator system 30 for adjustment of the suspension system 27.

With reference now to FIG. 2, in various embodiments, the vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more vehicles 10a-10n as described with regard to FIG. 1. In various embodiments, the operating environment 50 (all or a part of which may correspond to entities 48 shown in FIG. 1) further includes one or more user devices 54 that communicate with the vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the vehicles 10a-10n to schedule rides, dispatch vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline vehicle 10 and/or a vehicle based remote transportation system 52. To this end, a vehicle and vehicle based remote transportation system can be modified, enhanced, or otherwise supplemented to provide the additional features described in more detail below.

Figure 3:
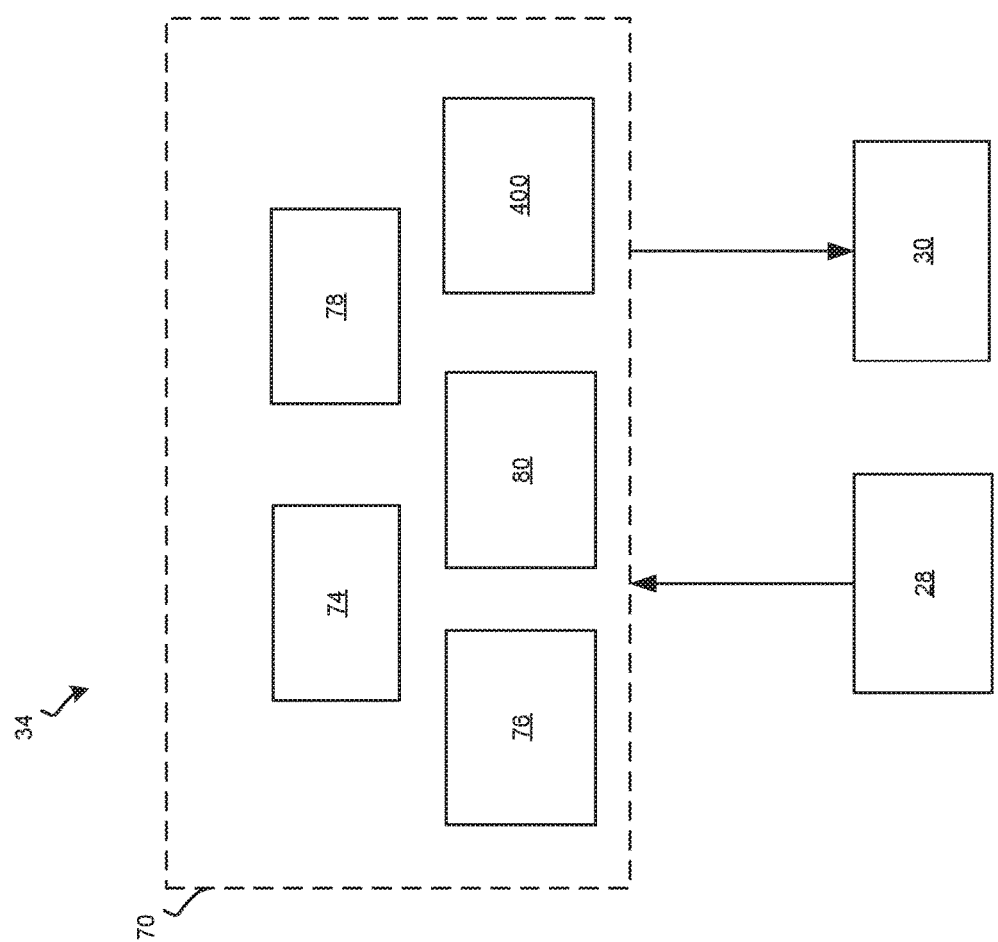
FIG. 3 is functional block diagram illustrating an autonomous driving system (ADS) having a sensor alignment adjustment system associated with the vehicle of FIG. 1, in accordance with various embodiments.

In accordance with various embodiments, the controller 34 implements an autonomous driving system (ADS) as shown in FIG. 3. That is, suitable software and/or hardware components of the controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, as discussed above with regard to FIG. 1, one or more instructions of the controller 34 are embodied in the sensor alignment adjustment system 100. All or parts of the sensor alignment adjustment system 100 may be embodied in the computer vision system 74, and/or the vehicle control system 80 or may be implemented as a separate system (referred to as a sensor alignment adjustment system 400), as shown.

Figure 4:
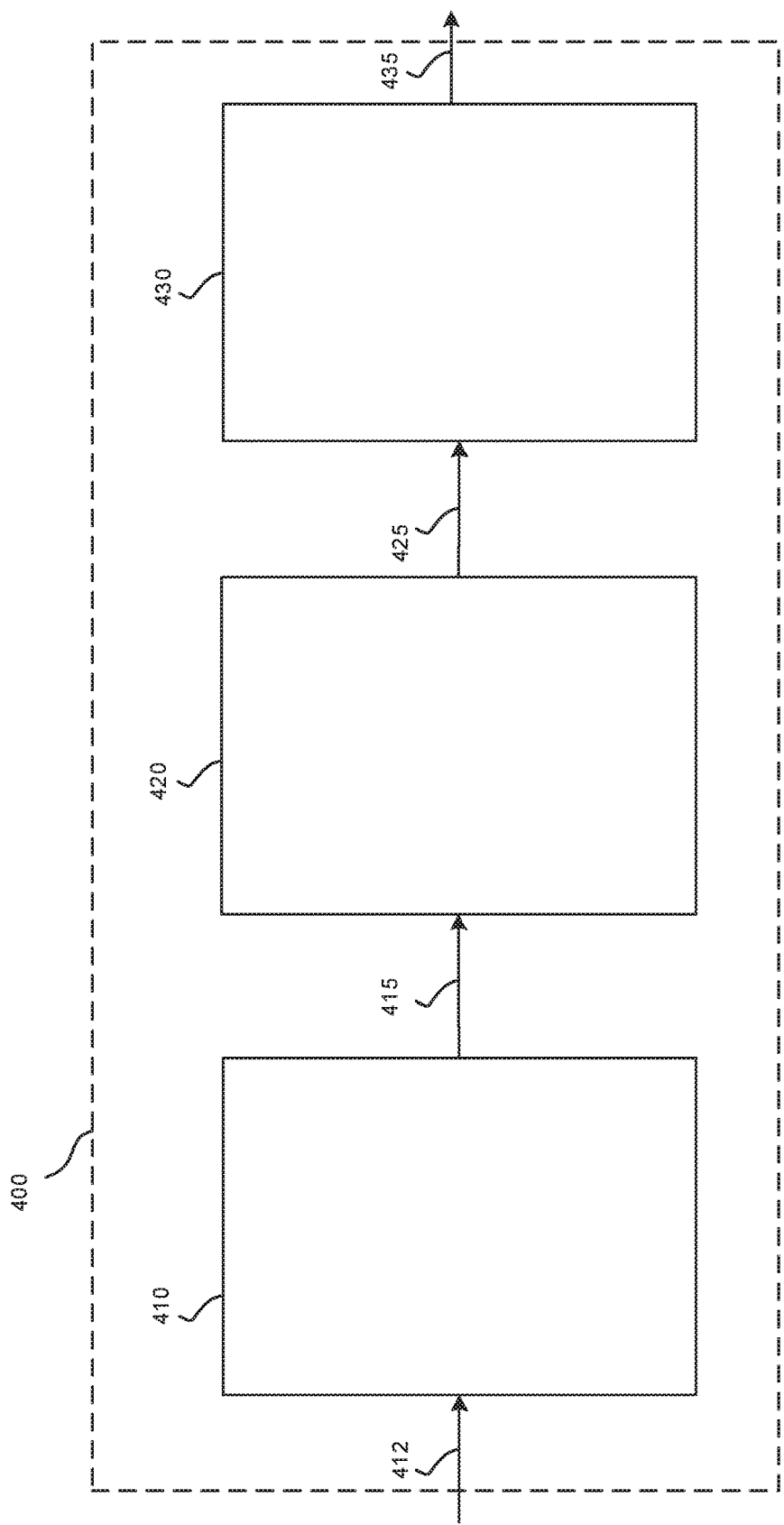
FIG. 4 is a functional block diagram illustrating the sensor alignment adjustment system, in accordance with various embodiments.

Referring to FIG. 4 and with continued reference to FIG. 1, the sensor alignment adjustment system 400 generally includes a detection module 410, a processing module 420, and an actuating module 430. In various embodiments, each of the detection module 410, the processing module 420, and the actuating module 430 are disposed onboard the vehicle 10. As can be appreciated, in various embodiments, parts of the sensor alignment adjustment system 400 may be disposed on a system remote from the vehicle 10 while other parts of the sensor alignment adjustment system 400 may be disposed on the vehicle 10.

In various embodiments, the detection module 410 receives sensor data 412 from various sensors 40a-40n of the vehicle 10. The detection module 410 processes the sensor data 412 in order to determine a current alignment 415 of at least one of the sensors 40a-40n. In various embodiments, the sensor data 412 may include position information regarding alignment of a sensor itself or position information regarding alignment of another sensor. The position information may be detected, for example, via a gyro sensor component or other component. In various other embodiments (as will be discussed in more detail with regard to FIGS. 5 and 6), the sensor data 412 may include image, lidar, and/or radar information from the sensor itself or image, lidar, and/or radar information from another sensor. The detection module 410 processes the image, lidar, and/or radar information to determine current positions and alignment of the sensors 40a-40n.

The processing module 420 receives the alignment 415 of one of more of the sensors 40a-40n, performs analysis with respect to the received alignments 415, and generates instructions 425 as appropriate for adjustment of the suspension system 27 of the vehicle 10, to adjust the alignment of the sensors 40a-40n. For example, the processing module 420 determines, based on the current alignment of a sensor, whether the sensor is out of alignment based on a comparison of the current alignment and a baseline alignment value (e.g., a baseline calibration stored in the data storage device). When a difference between the current alignment of the sensor and a known baseline value exceeds a predetermined threshold, then the sensor is determined to be out of alignment. When the sensor is determined to be out of alignment, the processing module 420 generates instructions for causing one or more actuators to adjust the suspension system 27 of the vehicle 10, to re-align the sensor. For example, an instruction is selected from predefined instructions based on an association with the sensor and/or type or value of misalignment.

In various embodiments, the actuating module 430 receives the instructions 425 and implements the instructions received from the processing module 420. For example, the actuating module 430 implements the instructions by generating control signals 435 to one or more actuators associated with the suspension system 27. In certain embodiments, the actuating module 430 implements the instructions such that shock absorbers 71, the springs 72 and/or associated airbags, and/or adjustment systems 73 (e.g., a hydraulic system, an electromagnetic system, and/or electromechanical system) of the suspension system 27 are adjusted (via one or more associated actuators) by an amount, to adjust the re-align of one or more sensors 40a-40n of the vehicle 10.

Figure 5:
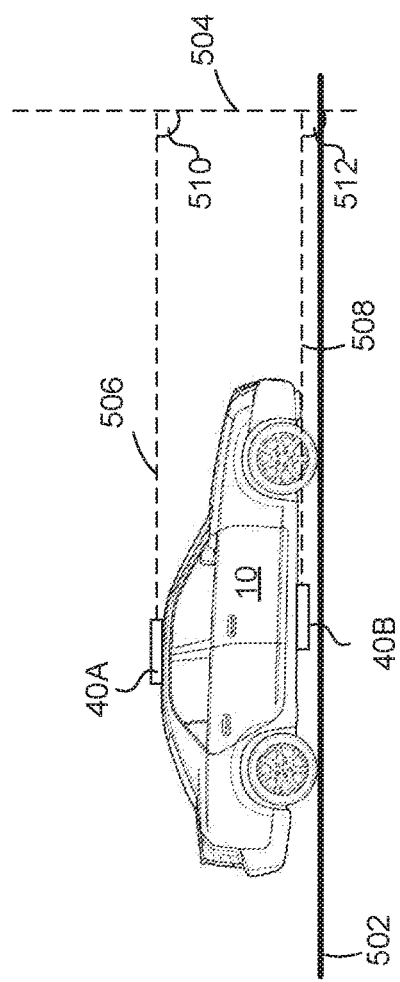
FIGS. 5 and 6 are schematic diagrams of the vehicle on a roadway in different situations, illustrating implementation of the sensor alignment adjustment system of FIG. 4 and the vehicle and components of FIGS. 1-3, in accordance with various embodiments.
Figure 6:
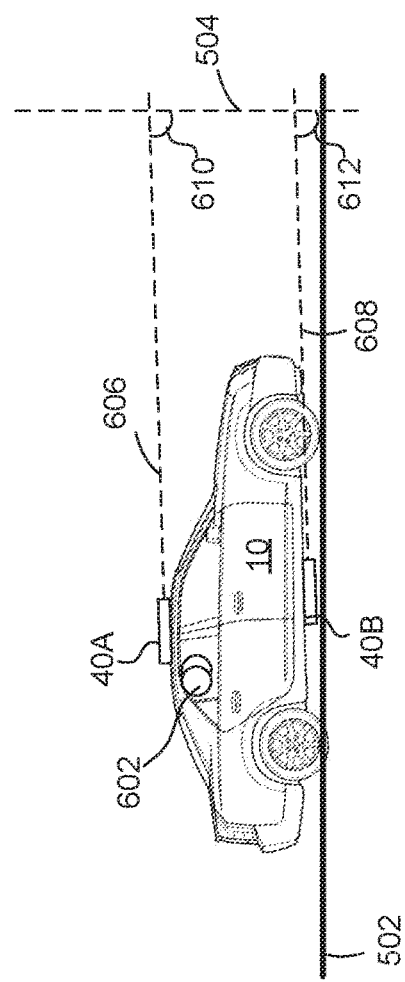

FIGS. 5 and 6 are schematic diagrams of the vehicle 10 on a roadway in different situations, in accordance with exemplary embodiments. In various embodiments, the vehicle 10 of FIGS. 5 and 6 correspond to the vehicle 10 of FIGS. 1-3, and includes the sensor alignment adjustment system 400 of FIG. 4. As depicted in FIGS. 5 and 6, the sensors may include one or more first sensors 40A disposed on or near a top portion of the vehicle 10, in addition to one or more second sensors 40B disposed on or near a bottom portion of the vehicle 10. In one embodiment, the first sensors 40A comprise lidar sensors, and the second sensors 40B comprise radar sensors. However, this may vary in other embodiments. In various embodiments, any number of different types of sensors (e.g., the various different types of sensors discussed above in connection with the sensor system 28 of FIG. 1) may be utilized, and may be disposed at any number of different locations on or within the vehicle 10.

FIG. 5 depicts the vehicle 10 with the sensors 40A and 40B properly aligned as the vehicle 10 travels along the roadway 502. As depicted in FIG. 5, a vertical plane 504 is depicted perpendicular to a level roadway 502 (and/or the ground). This vertical plane 504 may be obtained by the detection module 410 from the image, lidar, and/or radar information or may be a known vertical plane and identified based on its location. In the example of FIG. 5, the first sensor 40A is positioned at an angle 510 with respect to the vertical plane 504, and the second sensor 40B is positioned at an angle 512 with respect to the vertical plane 504. In various embodiments, angle 510 represents an angle made between the vertical plane 504 and a direction 506 of signals emitted from the first sensor 40A, and angle 512 represents an angle made between the vertical plane 504 and a direction 508 of signals emitted from the second sensor 40B.

In the depicted example, the first angle 510 and the second angle 512 are both ninety degrees, so that directions 506 and 508 are both parallel to the level roadway 502. This may vary in different embodiments. For example, in certain embodiments, the respective angles 510, 512 may vary from each other, and/or may be greater than or less than ninety degrees. In any case, in various embodiments, the first and second angles 510, 512 represent respective angles for when the sensors 40A and 40B are in alignment.

FIG. 6 depicts a condition of the vehicle 10 where with the sensors 40A and 40B that are not in alignment. In the example of FIG. 6, weight from passengers 602 in the rear of the vehicle 10 has caused a shift in the vehicle 10, so that the rear of the vehicle 10 is somewhat lower than the front of the vehicle 10 (or pitched with respect to the level ground). As a result, respective angles 610 and 612 of the respective directions 606, 608 of the signals emitted from the sensors 40A, 40B with respect to the vertical plane 504 have now changed, so that directions 606, 608 are not parallel to the roadway 502 or ground.

Accordingly, in this example, when the sensors 40A, 40B are determined to be out of alignment in a magnitude that exceeds a predetermined threshold tolerance level, then the sensor alignment adjustment system 400 adjusts the suspension system 27 of the vehicle 10, to realign the sensors 40A 40B back to the respective alignment positions of FIG. 5 (e.g., such that the respective angles 610 and 612 revert back to the aligned angles 510 and 512 of FIG. 5).

While certain exemplary implementations are depicted in FIGS. 5 and 6, it will be appreciated that the sensor alignment adjustment system 400 may similarly be implemented in various other situations. For example, in various other situations, unequal distribution of weight may be caused by occupants and/or cargo in any number of other locations of the vehicle 10 that may result in the sensors being out of alignment, so that the suspension system may be adjusted in a different direction to bring the sensors back into alignment. By way of further example, various different types of inclines and/or other conditions of the roadway 502 and/or the associated terrain may likewise result in the sensors being out of alignment, so that the suspension system may be adjusted in a different direction to bring the sensors back into alignment, and so on.

Figure 7:
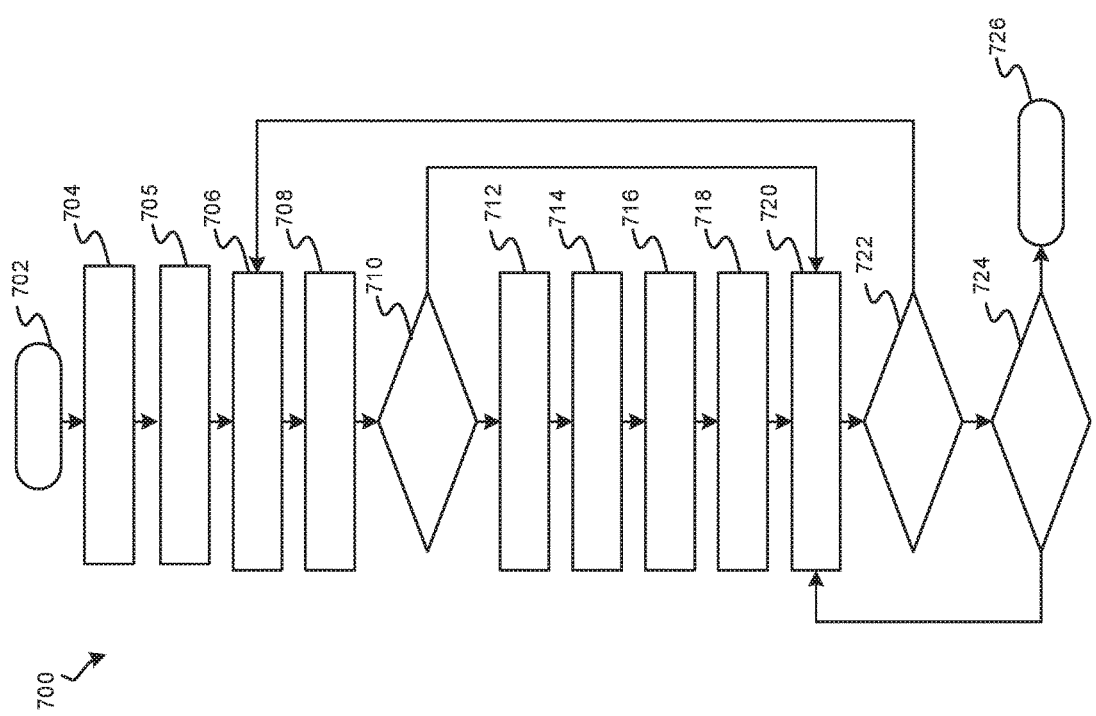
FIG. 7 is a flowchart for a control process for adjusting alignment of a sensor system of a vehicle, in accordance with various embodiments.

With reference to FIG. 7, a flowchart is provided for a control process 700 for adjusting alignment of sensors of a vehicle using a suspension system of the vehicle, in accordance with an exemplary embodiment. In accordance with various embodiments, the control process 700 can be implemented in connection with the sensor alignment adjustment system 100 and vehicle 10 of FIG. 1, the transportation system 52 of FIG. 2, the autonomous driving system of FIG. 3, the sensor alignment adjustment system 400 of FIG. 4, and the implementations of FIGS. 5 and 6, in accordance with various embodiments. As can be appreciated in light of the disclosure, the order of operation within the control process 700 is not limited to the sequential execution as illustrated in FIG. 7, but may be performed in one or more varying orders as applicable and in accordance with the present disclosure. In various embodiments, the control process 700 can be scheduled to run based on one or more predetermined events, and/or can run continuously during operation of the vehicle 10.

In various embodiments, the control process 700 may begin at 702. In various embodiments, process step 702 occurs when an occupant is within the vehicle 10 and the vehicle 10 begins operation in an automated or non-automated manner.

In certain embodiments, calibration is performed for sensors of the vehicle at 704. In various embodiments, the processing module calibrates the sensors and stores the values prior to accepting occupants. Also in certain embodiments, the vehicle 10 travels through a tunnel or one or more other fixed reference points that have known, fixed objects in three dimensional space. Also in certain embodiments, images and/or other sensor data are generated from the sensors and compared with known or expected values with respect to the fixed referenced points, and the sensors are then calibrated accordingly to adjust for any deviations between the obtained sensor data and the expected values.

One or more events are detected at 705. In certain embodiments, the event detection comprises a detection as to when one or more occupants enter the vehicle 10. In various embodiments, such a detection may occur, for example, by one or more sensors (e.g., sensors 40a-40n of FIG. 1, such as sensors 40A and 40B of FIGS. 5 and 6) detecting the weight of an occupant on a seat of the vehicle 10, engagement of a start button or device by an occupant of the vehicle 10, engagement of an input device or one or more other devices inside the vehicle 10, or the like.

In certain other embodiments, the event detection comprises a detection as to when the vehicle 10 is in motion. In various embodiments, such a detection may occur, for example, by one or more sensors (e.g., sensors 40a-40n of FIG. 1, such as sensors 40A and 40B of FIGS. 5 and 6) detecting when the vehicle 10 is moving (e.g., via one or more wheel speed sensors, accelerometers, and/or a navigation system, or the like).

In certain further embodiments, the event detection comprises a detection as to when the vehicle 10 has encountered uneven terrain (e.g., if the vehicle 10 is being operated on a hill or an incline). In various embodiments, such a detection may occur, for example, by one or more sensors (e.g., sensors 40a-40n of FIG. 1, such as sensors 40A and 40B of FIGS. 5 and 6) detecting an angular position and/or direction of travel of the vehicle 10 (e.g., via one or more wheel sensors, accelerometers, inertial measurement units, and/or a navigation system, or the like).

Sensor data is obtained at 706. In various embodiments, data is obtained with respect to the position and/or operation of sensors of the vehicle 10 (e.g., sensors and/or sensors 40a-40n of FIG. 1, such as sensors 40A and 40B of FIGS. 5 and 6). In certain embodiments, the sensor data is obtained with respect to a position or movement of the sensors (e.g., via a gyro sensor component, either of the sensor itself or one or more associated other sensors).

In certain other embodiments, the sensor data comprises images, readings, measurements, data, range, depth, reflectivity and/or other values generated by the sensors during operation. For example, in certain embodiments, the images, readings, measurements, data, and/or other values generated by the sensors in the same tunnel or other reference point region, or a similar tunnel or other reference point region, as for the calibration of 704, for comparison purposes.

The sensor data is analyzed at 708. In various embodiments, the sensor data of 706 is analyzed by one or more processors for a determination as to whether the sensors are out of alignment. Also in various embodiments, the processor compares current values of the sensor data of 706 (e.g., current values of the position and/or movement values of the sensors, and/or current values of the images, readings, measurements, data, and/or other values generated by the sensors) to corresponding known reference values for the sensors for when the sensors are in alignment (e.g., current values of the position and/or movement values of the sensors, and/or current values of the images, readings, measurements, data, and/or other values generated by the sensors, for when the sensors are in alignment). In certain embodiments, the sensor data is processed through one or more filters (e.g., a Kalman filter) prior to and/or part of the analysis.

A determination is made as to whether the sensors are in alignment at 710. In various embodiments, one or more processors utilize the analysis of 708 to determine, at 708, whether the sensors are in alignment.

In various embodiments, a particular sensor is determined to be in alignment if a difference between the current sensor values for the sensor (e.g., current values of the position and/or movement values of the sensors, and/or current values of the images, readings, measurements, data, and/or other values generated by the sensors) and the respective known reference value is within (i.e., less than or equal to) a predetermined tolerance threshold that is stored in memory (e.g., storage device 46 of FIG. 1). Conversely, also in various embodiments, a particular sensor is determined to be out of alignment if the difference between the current sensor values for the sensor (e.g., current values of the position and/or movement values of the sensors, and/or current values of the images, readings, measurements, data, and/or other values generated by the sensors) and the respective known reference value is greater than the predetermined tolerance threshold. In various embodiments, one or more Kalman filters may be utilized for determining whether the particular sensor is out of alignment. For example, in various embodiments, if a difference between a state prediction and a sensor prediction is greater than a predetermined threshold, then a Kalman gain factor may be utilized to flag or trigger sensor adjustments to bring the difference between the state and the sensor predictions closer to zero. In other embodiments, various other techniques may also be utilized.

In one embodiment, the sensor is determined to be in alignment if a difference between a current angular position of the sensor (e.g., angles 510, 512, 610, and/or 612 of FIGS. 5 and 6 with respect to vertical plane 504, and/or associated angles with respect to the roadway 502 of FIGS. 5 and 6) and a known reference value for the angular position of the sensor is less than a predetermined threshold, based on the analysis of the sensor data. Also in one embodiment, the sensor is determined to be out of alignment if the difference between the current angular position of the sensor and the known reference value for the angular position of the sensor is greater than the predetermined threshold. Similar to the discussion above, in various embodiments, one or more Kalman filters may be utilized for determining whether the particular sensor is out of alignment. In various other embodiments, various other techniques may also be utilized.

If it is determined that the sensors are in alignment (e.g., that the difference between the current angular position and/or other parameters and the known reference values are within a predetermined tolerance threshold), then the process proceeds to 720. As discussed further below, at 720, the vehicle 10 continues traveling as normal, without adjusting the suspension system.

Conversely, if it is determined that one or more of the sensors are out of alignment (e.g., that the difference between the current angular position and/or other parameters and the known reference values are within a predetermined tolerance threshold), then determinations are made at 712 as to which sensors are out of alignment, and the extent of any non-alignment of the sensors. In various embodiments, one or more processors determine for which sensors the difference between the current angular position (or other current values) and the respective known reference values exceeds the respective predetermined threshold, as well as a magnitude as to how far the difference exceeds the respective predetermined threshold for each sensor.

Alignment instructions are generated at 714. In various embodiments, one or more processors generate alignment instructions for adjustment of the suspension system 27 of FIG. 1 to result in adjustment, and realignment, of the sensors. For example, in various embodiments, the processor generates instructions for one or more actuators to adjust one or more components of the suspension system, to also adjust the sensors to their originally aligned positions. For example, if the sensors were out of alignment (e.g., the example of FIG. 6), then the instructions are generated so as to return the sensors as close as possible (and preferably, at least approximately to) the alignment positions of the sensors (e.g., the example of FIG. 5).

In certain embodiments, the processing module 420 generates instructions for one or more actuators 42a-42n of FIG. 1 to adjust one or more components of the suspension system 27 of FIG. 1. For example, in various embodiments, the instructions may comprise instructions for one or more of the following: (a) adjusting a length of a shock absorber 71 of the suspension system 27 using an airbag (e.g., by increasing or decreasing air pressure in the airbag), and/or via one or more other actuators (e.g., a linear actuator); (b) changing air pressure in an airbag utilized as a spring of the suspension system (e.g., by increasing or decreasing air pressure in an airbag that is used in place of a mechanical spring as part of the springs 72 of the suspension system 27); (c) pumping oil via a hydraulic system of the suspension system (e.g., by pumping into, or releasing oil out of, a strut and/or other component via a hydraulic system as one of the systems 73 of the suspension system 27); (d) utilizing electromagnetic suspension control for the suspension system, among other possible adjustments for the suspension system 27 (e.g., by utilizing electronic suspension control and/or magnetic dampers, such as by passing electric current through a ferrous fluid to adjust suspension stiffness, via an electromagnetic system as one of the systems 73 of the suspension system 27); and/or (e) utilizing an electric motor of an electromechanical system to adjust a ride height of one or more wheels 16, 18 of the vehicle 10 (e.g., by adjusting a screw or other device to adjust a linkage in the suspension), to also adjust the alignment of the sensors 40.

In certain embodiments, the nature and/or magnitude of the adjustments of 714 are determined based on which sensors 40a-40n are out of alignment, and to what extent that the sensors 40a-40n are out of alignment. In addition, in certain embodiments, if some sensors but not all of the sensors 40a-40n are out of alignment, then the instructions will also take the aligned sensors into account, for example to ensure that adjustments to the suspension system 27 will not cause the aligned sensors to become out of alignment, and so on. In various embodiments, one or more Kalman filters may be utilized for determining the nature and/or magnitude of the adjustments of 714. In various other embodiments, various other techniques may also be utilized.

The instructions are transmitted at 716. In certain embodiments, the processing module 420 provides instructions for the transmission of the instructions via the actuating module 430. In certain embodiments, the instructions are transmitted via the communication system 36 of FIG. 1 (e.g., via a vehicle communications bus). This may vary in different embodiments.

The instructions are then implemented at 718. In various embodiments, respective actuators 42a-42n implement the processor-based instructions by moving and/or otherwise adjusting respective components of the suspension system 27 (and/or other associated components of the vehicle 10), to also adjust the alignment (and, preferably, to realign) the sensors.

In addition, the vehicle 10 continues traveling at 720. In various embodiments, the vehicle 10 continues to travel as normal. In certain embodiments, the vehicle 10 waits to begin or resume traveling until the adjustments of 718 are implemented. In certain other embodiments, the vehicle 10 continues to travel as the adjustments of 718 are implemented.

In certain embodiments, determinations continue to be made at 722 (e.g., similar to 705 above), if a new event is detected (e.g., new occupants entering the vehicle 10, and/or new uneven terrain encountered by the vehicle 10). Similar to 705 above, in certain embodiments these determinations are made by the processing module 420 of FIG. 4).

If it is determined that a new event is detected, then the process returns to 706, and the process repeats beginning with the above-described 706, in one embodiment. Conversely, if it is determined that a new event is not detected, then, in one embodiment, the process instead proceeds to 724, discussed below.

During 724, in one embodiment, a determination is made as to whether the vehicle 10 has reached its destination. For example, in one embodiment, the processing module 420 of FIG. 4 determines (e.g., based on data provided by a navigation system of the vehicle 10) whether the vehicle 10 has reached a destination that was previously inputted or requested by an occupant of the vehicle 10.

In one embodiment, if the vehicle 10 has not reached its destination, then the process returns to 720, as the vehicle 10 continues to travel. In one embodiment, the process then repeats, beginning with 720, until the vehicle 10 has reached its destination. Also in one embodiment, once the vehicle 10 has reached its destination, the process terminates at 726.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for adjusting a sensor of a vehicle having a suspension system, the method comprising:
   obtaining sensor data pertaining to a sensor of the vehicle;
   determining, via a processor, when the sensor is out of alignment, using the sensor data; and
   adjusting the suspension system, resulting in an adjustment of the alignment of the sensor, when the sensor is determined to be out of alignment.

2. The method of claim 1, wherein the step of adjusting the suspension system comprises, when the sensor is determined to be out of alignment:
   providing instructions to an actuator that is coupled to a component of the suspension system; and
   adjusting the component of the suspension system via the actuator in accordance with the instructions.

3. The method of claim 2, wherein the step of adjusting the component of the suspension system comprises adjusting a length of a shock absorber of the suspension system using an airbag.

4. The method of claim 2, wherein the step of adjusting the component of the suspension system comprises changing air pressure in an airbag utilized as a spring of the suspension system.

5. The method of claim 2, wherein the step of adjusting the component of the suspension system comprises utilizing electromagnetic suspension control for the suspension system.

6. The method of claim 2, wherein the step of adjusting the component of the suspension system comprises adjusting a ride height of a wheel of the vehicle using an electromechanical device.

7. The method of claim 1, further comprising:
   detecting entry of one or more occupants in the vehicle;
   wherein the steps of the determining when the sensor is out of alignment and adjusting the suspension system are performed after the entry of one or more occupants has been detected in the vehicle.

8. The method of claim 1, further comprising:
   detecting uneven terrain on a roadway in which the vehicle is traveling;
   wherein the steps of the determining when the sensor is out of alignment and adjusting the suspension system are performed after the uneven terrain is detected.

9. The method of claim 1, wherein:
   the step of determining when the sensor is out of alignment comprises determining, via the processor, that the sensor is out of alignment when a difference between a current angular position of the sensor and a known aligned angular position of the sensor is greater than a predetermined threshold; and
   the step of adjusting the suspension system comprises adjusting the suspension system, resulting in adjustment of the current angular position approximately back to its aligned angular position, when the difference between the current angular position of the sensor and the aligned angular position of the sensor is greater than the predetermined threshold.

10. A system for adjusting a sensor of a vehicle having a suspension system, the system comprising:
    a detection module configured to obtain sensor data pertaining to a sensor of the vehicle;
    a processing module configured to determine when the sensor is out of alignment, using the sensor data; and
    an actuating module configured to adjust the suspension system, resulting in an adjustment of the alignment of the sensor, when the sensor is determined to be out of alignment.

11. The system claim 10, wherein:
    the detection module is further configured to detect entry of one or more occupants in the vehicle;

the processing module is configured to determine when the sensor is out of alignment after the entry of the one or more occupants has been detected; and the actuating module is configured to adjust the suspension system after the entry of one or more occupants has been detected in the vehicle.

12. The system claim 10, wherein:

the detection module is further configured to detect uneven terrain on a roadway in which the vehicle is traveling;

the processing module is configured to determine when the sensor is out of alignment after the uneven terrain has been detected; and the actuating module is configured to adjust the suspension system after the uneven terrain has been detected.

13. The system of claim 10, wherein:

the processing module is configured to determine when the sensor is out of alignment when a difference between a current angular position of the sensor and a known aligned angular position of the sensor is greater than a predetermined threshold; and the actuating module is configured to adjust the suspension system, to adjust the current angular position approximately back to its aligned angular position, when the difference between the current angular position of the sensor and the aligned angular position of the sensor is greater than the predetermined threshold.

14. The system of claim 10, wherein the system is configured for installation as part of an autonomous vehicle.

15. A system for adjusting a sensor of a vehicle having a suspension system, the system comprising:

a processor configured to:

determine when the sensor is out of alignment, using sensor data pertaining to the sensor; and provide instructions for adjustment of the suspension system when sensor is determined to be out of alignment; and an actuator configured to adjust the suspension system, in accordance with the instructions, resulting in an adjustment of the alignment of the sensor, when the sensor is determined to be out of alignment.

16. The system of claim 15, wherein the actuator is configured to implement the instructions by adjusting a length of a shock absorber of the suspension system using an airbag.

17. The system of claim 15, wherein the actuator is configured to implement the instructions by changing air pressure in an airbag utilized as a spring of the suspension system.

18. The system of claim 15, wherein the actuator is configured to implement the instructions by utilizing electromagnetic suspension control for the suspension system.

19. The system of claim 15, wherein the actuator is configured to implement the instructions by adjusting a ride height of a wheel of the vehicle using an electromechanical device.

20. The system of claim 15, wherein:

the processor is configured to determine when the sensor is out of alignment when a difference between a current angular position of the sensor and a known aligned angular position of the sensor is greater than a predetermined threshold; and the actuator is configured to adjusting the suspension system, to adjust the current angular position approximately back to its aligned angular position, when the difference between the current angular position of the sensor and the aligned angular position of the sensor is greater than the predetermined threshold.

* * * * *